(12) United States Patent
Buggs, Sr.

(10) Patent No.: US 9,335,078 B1
(45) Date of Patent: May 10, 2016

(54) AIR CONDITIONING SYSTEM

(71) Applicant: Gregory D. Buggs, Sr., Wichita, KS (US)

(72) Inventor: Gregory D. Buggs, Sr., Wichita, KS (US)

(*) Notice: Subject to any disclaimer, the term of this patent is extended or adjusted under 35 U.S.C. 154(b) by 242 days.

(21) Appl. No.: 13/850,826

(22) Filed: Mar. 26, 2013

(51) Int. Cl.
*F25B 39/04* (2006.01)

(52) U.S. Cl.
CPC ........................... *F25B 39/04* (2013.01)

(58) Field of Classification Search
CPC .................................. F25B 39/04; F25B 45/00
USPC .................................. 62/77, 527; 137/68, 223
See application file for complete search history.

(56) References Cited

U.S. PATENT DOCUMENTS

| | | | | |
|---|---|---|---|---|
| 3,208,232 A | * | 9/1965 | Madison | F25B 45/00 62/149 |
| 3,424,181 A | * | 1/1969 | Morse | F16K 1/306 137/316 |
| 6,199,396 B1 | * | 3/2001 | Aizawa | F16K 1/10 137/360 |
| 6,305,081 B1 | * | 10/2001 | Beaver | B60H 1/00485 29/890 |

* cited by examiner

*Primary Examiner* — Emmanuel Duke
(74) *Attorney, Agent, or Firm* — Kenneth H. Jack; Davis & Jack, L.L.C.

(57) ABSTRACT

An air conditioning system for refrigerant based cooling of air within a building, the air conditioning system including an outdoor condenser unit having a refrigerant output port and a refrigerant input port; an indoor evaporator unit having a refrigerant input port and refrigerant output port; a pair of refrigerant carrying lines having a condenser unit and evaporator unit ends, one of the lines extending from the condenser unit's refrigerant output port to the evaporator unit's refrigerant input port, and the other line extending from the evaporator unit's refrigerant output port to the condenser unit's refrigerant input port; and exterior and interior pairs of isolation valves respectively operatively connected to the refrigerant carrying lines' condenser and evaporator unit ends, each isolation valve having at least a first pressure testing port opening its upstream or downstream end.

6 Claims, 5 Drawing Sheets

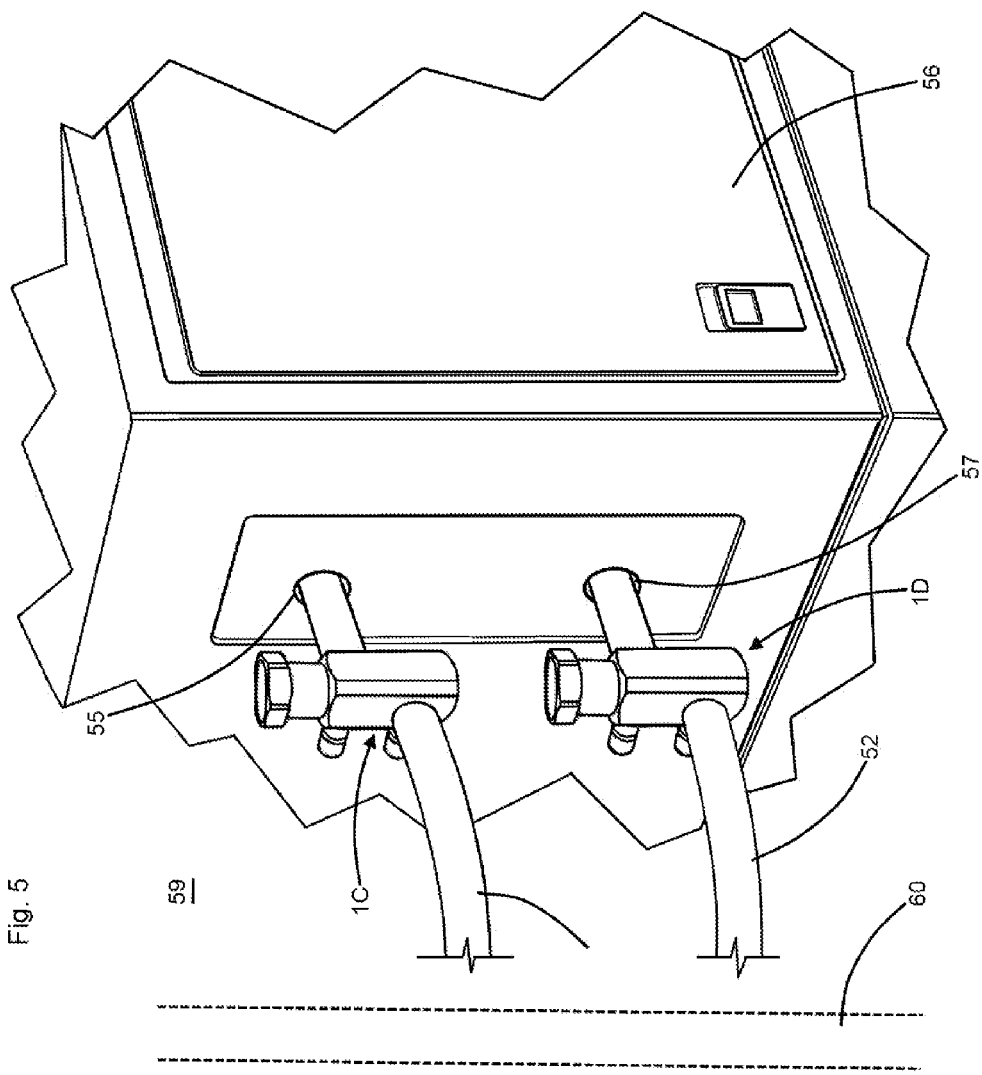

AIR CONDITIONING SYSTEM

CLAIM OF PRIORITY FROM PREVIOUSLY FILED PROVISIONAL PATENT APPLICATION

This non-provisional patent application claims the benefit of and priority from U.S. provisional patent application No. 61/687,424 filed Apr. 25, 2012. The inventor disclosed in said provisional application is the same person as the person who is disclosed as the inventor in the instant application. The applicant asserts that structures and functions of structures disclosed and described in the instant application are in numerous respects the same as those described in said provisional application.

FIELD OF THE INVENTION

This invention relates to refrigerant based air conditioning systems. More particularly, this invention relates to such systems which include an exterior or out of doors condenser unit powered by an electric motor driven compressor, and which include an interior or indoor evaporator unit typically including an "A" coil endothermic heat exchanging element.

BACKGROUND OF THE INVENTION

Common residential or commercial air conditioning systems include an exterior condenser unit and an interior evaporator unit. In such systems, an inert refrigerant fluid such as freon gas is compressed within the system's exterior condenser unit, and excess heat generated during the compression is conducted to the outside environment via the operation of heat radiating fins and an electric motor powered cooling fan. Such compressed refrigerant is then conducted via high pressure air conditioner refrigerant conveying lines through an aperture within the building's exterior wall to enter an interior evaporator unit component which includes an endothermically radiating "A" coil element. Refrigerant pressure and flow within the system's flow loop or circuit injects the compressed refrigerant into the "A" coil and conveys the refrigerant therethrough. Phase changes within with the refrigerant from a compressed liquid to a substantially evaporated or atomized form occurring within the "A" coil dramatically cool the "A" coil, and also cool the fan driven air which flows over the "A" coil and dispenses into the interior of the building. Gaseous refrigerant emitting from the "A" coil and emitting from the system's evaporator unit returns via air conditioning lines to the outdoor condenser unit for recompression and exterior heat dissipation and for successive further cooling upon return to the "A" coil in a fluid flow circuit.

A commonly encountered problem with such air conditioning systems is refrigerant leaks. A small leak at any location within the system's refrigerant flow loop or circuit including liquid and suction air conditioning refrigerant conveying lines extending to and from the building, heat exchanging conduits within the exterior condenser unit, and heat exchanging conduits within the interior evaporator unit, may undesirably render the entire system inoperable. Locating such leaks is often difficult, and leak locating difficulties undesirably complicate the task of repairing system leaks.

The instant inventive air conditioning system solves or ameliorates the problems described above, while preserving all of the normal functionality of commonly known compressed refrigerant based air conditioning systems by including within the refrigerant flow loop or circuit a series of specially configured and specially placed refrigerant isolation valves.

BRIEF SUMMARY OF THE INVENTION

The instant inventive air conditioning system is intended for use in refrigerant based cooling of air within a building. In a preferred embodiment, the inventive air conditioning system comprises a condenser unit mounted outwardly from or at the outdoor side of an exterior wall of the building, and comprises an evaporator unit mounted at the interior or indoor side of such external wall. In a typical embodiment, the condenser unit houses a refrigerant compressor, a matrix of heat radiating tubes with heat conducting fins, and electric motor powered fan for continuously driving relatively cool outside air over the radiating tubes and fins. In the preferred embodiment, the condenser unit communicates with air conditioning refrigerant carrying lines at a liquid refrigerant output port and an evaporated refrigerant input port.

The evaporator unit component of the instant inventive air conditioning system typically houses an "A" coil element for endothermic heat conduction which cools the building's interior air. An electric motor driven fan housed in the unit continuously drives relatively warm air over and through the "A" coil. In order to form and complete a refrigerant flow circuit in relation to the condenser unit, the evaporator unit preferably includes a liquid refrigerant input port and an evaporator refrigerant output port.

A further structural component of the instant inventive air conditioning system comprises a pair of refrigerant carrying lines, each such line having a condenser unit end and an evaporator unit end. In a preferred embodiment, one of said refrigerant carrying lines extends from the condenser unit's liquid refrigerant output port to the evaporator unit's liquid refrigerant input port for communicating flows of compressed liquid refrigerant from the exterior condenser unit to the interior evaporator unit. The other refrigerant carrying line correspondingly extends from the evaporator unit's evaporated refrigerant output port to the condenser unit's evaporated refrigerant input port. Such line conveys flows of vaporized and relatively warm refrigerant from the evaporator unit through the building's exterior wall to the system's condenser unit, such return flow completing a refrigerant flow circuit.

Further structural components of the instant inventive air conditioning system comprise exterior and interior pairs of isolation valves. In a preferred embodiment, the exterior and interior pairs of isolation valves are respectively operatively connected to the refrigerant carrying lines' condenser and evaporator unit ends, each valve among the exterior and interior pairs of isolation valves preferably having upstream and downstream ends, and having a first, and preferably first and second, pressuring testing ports.

In a preferred embodiment of the instant inventive air conditioning system, each valve among the exterior and interior pairs of isolation valves comprises a seat, said each valve's seat being positioned between said each valve's upstream and downstream ends.

Also in a preferred embodiment, each of such seats is annular and has a conically configured wall which defines a portion of the flow path between the valve's upstream and downstream ends.

In a further preferred configuration of the instant inventive air conditioning system, each valve among the exterior and interior pairs of isolation valves comprises a valve sealing element and seating and unseating means. Each valve's seating and unseating means is preferably connected operatively to said each valve's sealing element for valve actuation which alternatively permits and resists flows of the refrigerant between said each valve's upstream and downstream end.

Accordingly, combinations of the valve seats, sealing elements, and seating and unseating means advantageously allow the valves to operate in the manner of a series of shut off or "on/off" valve which segment the refrigerant flow circuit into a series of isolatable zones.

While the sealing element may suitably comprise common valve opening and closing elements such as slide gates, flaps, and apertured balls, and while the seating and unseating means may suitably comprise actuators such as turn knobs and axle combinations or linearly slidable elements, the instant invention preferably incorporates a conical plug configured sealing element, and the preferably utilized seating and unseating means comprise a jack screw actuator having a helically threaded shaft which connects with the conical plug for driving the plug against the valve's conical seat.

In the preferred embodiment of the instant invention, the preferably provided first and second pressure testing ports are situated to open the valves' bodies on either side of each valve's seat, and between each valve's upstream and downstream ends. Upon such preferred positioning of the pressure testing ports, hydrostatic fluid communication for pressure testing continues to exist at the upstream and downstream ends of each valve upon closure of the valves. In order to facilitate pressure testing at the pressure testing ports while reducing refrigerant losses, such ports preferably incorporate flow checking and normally closed Schrader valves.

In operation of the preferred configuration of the instant inventive air conditioning system, an air conditioning system technician may close the system's pair of exterior isolation valves. As a result of such valve closure, the upstream pressuring testing port (of first port) of the valve which communicates with the condenser unit's liquid refrigerant output port may be utilized for testing refrigerant pressure within the condenser unit, and the downstream pressure testing port (or second port) of the other valve which communicates with the condenser unit's evaporated refrigerant input port may be alternatively utilized for the pressure test. Closure of the system's interior pair of isolation valves similarly permits alternative port pressure testing of refrigerant within the system's evaporator unit. Closure of all of the isolation valves advantageously allows the technician to independently gauge the pressure within both of the refrigerant carrying lines at either the exterior location next to the condenser unit or at the interior location next to the evaporator unit.

A functional advantage of the instant inventive air conditioning system is founded upon each isolation valve's preferred provision and inclusion of paired pressure testing ports which reside at opposite sides of the valve's seat and seal. Such pairing and positioning of pressure test ports advantageously eliminates any need during assembly and installation of the system of differentiation between valve upstream and downstream ends. In practice, the preferred specialized isolation valves of the instant inventive assembly are reversible, and are equally functional without regard to their orientations upon installation.

Suitably, though less desirably, isolation valves having only a single pressure test port may be utilized, provided that all of such ports are positioned at an upstream end or all of such valves are positioned at a downstream end.

Accordingly, objects of the instant invention include the provision of an air conditioning system which incorporates structures, as described above, and which arranges those structures in manners described above for the achievement of functional benefits described above.

Other and further objects, benefits, and advantages of the present invention will become known to those skilled in the art upon review of the Detailed Description which follows, and upon review of the appended drawings.

BRIEF DESCRIPTION OF THE DRAWINGS

FIG. 5 depicts an evaporator unit component of the instant invention having a second pair of valves identical to the valve of FIGS. 1-3 operatively connected.

DETAILED DESCRIPTION OF A PREFERRED EMBODIMENTS

Figure 4:
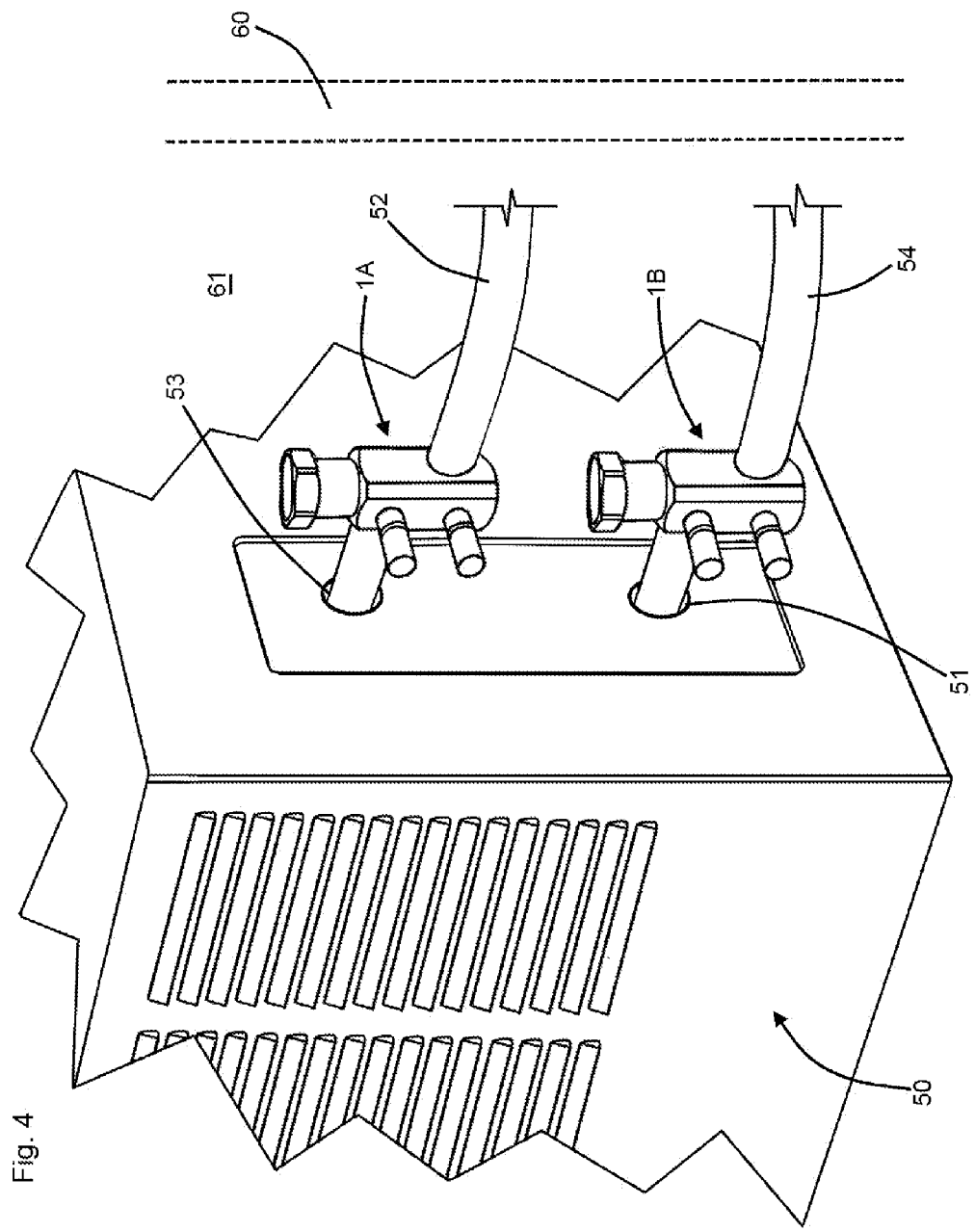
FIG. 4 depicts an air conditioning system condenser unit having a pair of isolation valves identical to the valve of FIGS. 1-3 operatively connected.

Referring now to the drawings, and in particular to Drawing FIG. 4, the instant inventive air conditioning system preferably comprises a condenser unit 50 which is mounted within an outdoor environment 61 relative to an exterior wall 60 of a commercial or residential building. Such exterior wall 60 may comprise a roof structure.

In a preferred embodiment, the condenser unit incorporates an electric motor driven refrigerant compressor, a heat radiating coil, and an electric motor driven fan, such components compressing evaporated refrigerant (received by the unit through evaporated refrigerant input port 53) into liquid refrigerant, and dissipating heat emanating from the refrigerant out of the unit and into the outside environment 61. The compressed liquid refrigerant exits the compressor unit 50 through liquid refrigerant output port 51.

Referring simultaneously to FIGS. 4 and 5, the instant inventive air conditioning system preferably further comprises an evaporator unit 56 which is mounted within the building's interior 59, inwardly from exterior wall 60. The indoor evaporator unit 56 preferably houses an endothermically heat exchanging "A" coil for receiving, expanding, and evaporating compressed liquid refrigerant. Unit 56 additionally houses an electric motor driven fan for driving interior building air over the "A" coil for cooling the air. In the preferred embodiment, the evaporator unit 56 comprises a liquid refrigerant input port 55, and an evaporated refrigerant output port 57.

Referring further simultaneously to FIGS. 4 and 5, the instant inventive air conditioning system preferably further comprises a pair of refrigerant carrying lines 52 and 54, the outdoor condenser unit ends of said lines being depicted in FIG. 4, and the indoor evaporator unit ends of said lines being depicted in FIG. 5. One of the refrigerant carrying lines (line 54 for example) effectively extends from the condenser unit's liquid refrigerant output port 51, through the building's exterior wall 60 to communicate with or extend through the liquid refrigerant input port 55 of the evaporator unit 56. Correspondingly, the other refrigerant carrying line, line 52, extends from the evaporated refrigerant output port 57 of the evaporator unit 56 to extend through wall 60 and to communicate with or pass through the evaporated refrigerant input port 53 of the condenser unit 50.

Referring further simultaneously to FIGS. 4 and 5, the instant inventive air conditioning system preferably further comprises an exterior pair of isolation valves 1A and 1B and an interior pair of isolation valves 1C and 1D. As is shown in Drawing FIGS. 4 and 5, said valve pairs are respectively operatively incorporated into the system's refrigerant flow loop or circuit at the condenser unit and evaporator unit ends of the refrigerant carrying lines.

Figure 1:
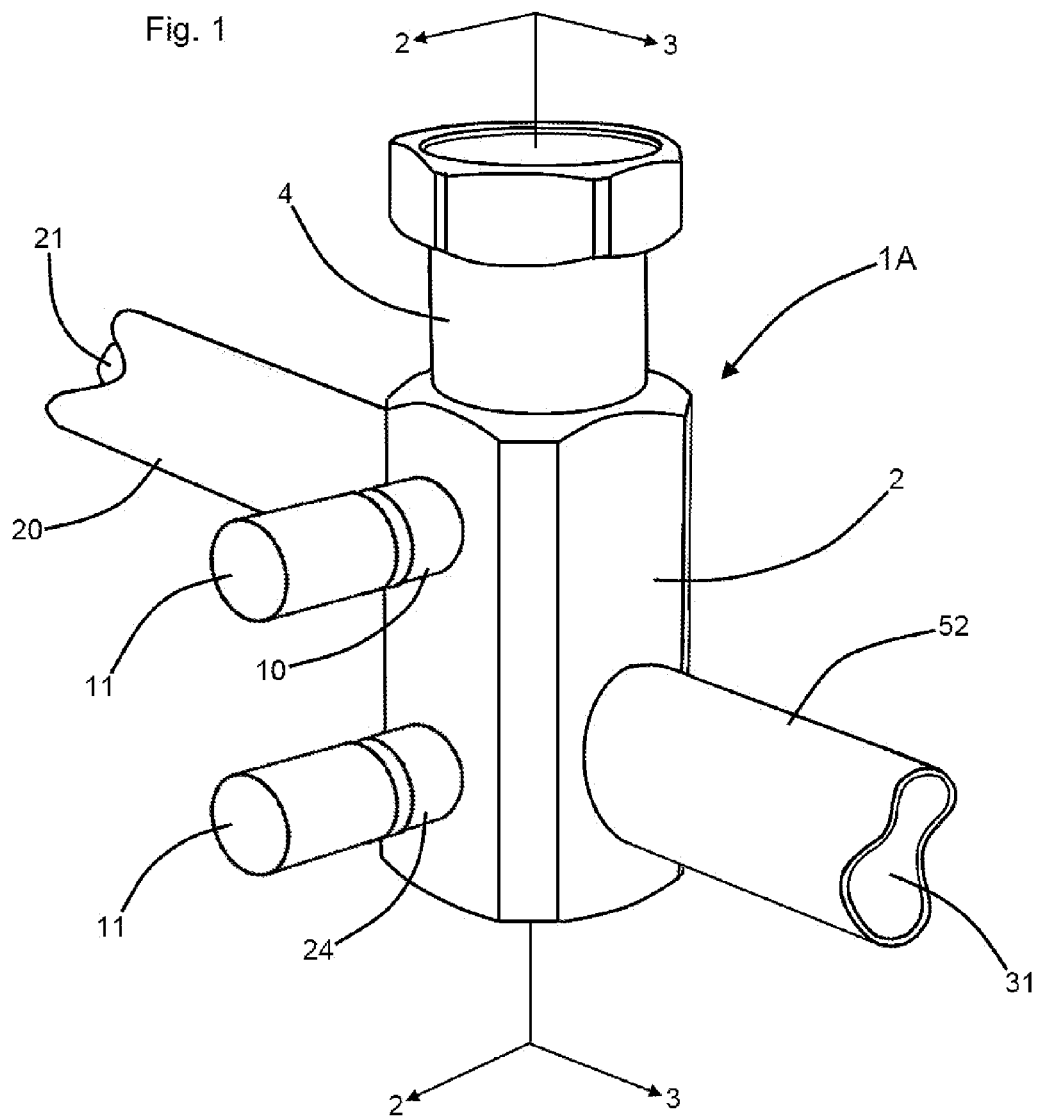
FIG. 1 is a perspective view of one of the isolation valves of the instant inventive air conditioning system.

Referring simultaneously to FIGS. 1, 4, and 5, each of the isolation valves 1B, 1C, and 1D is preferably configured substantially identically with isolation valve 1A. Valve 1A has a lower upstream end (according to the depicted mode of said valve's installation) having an evaporated refrigerant intake port 28, such port communicating with the fluid conveying bore 31 of evaporated refrigerant line 52. Isolation valve 1A has an upper downstream end (also according to such installation mode) which is opened by output port 14, such port being in communication with the hollow bore 21 of output tube 20, such tube extending through or being mounted in communication with the evaporated refrigerant intake port 43 of the condenser unit 50.

Figure 2:
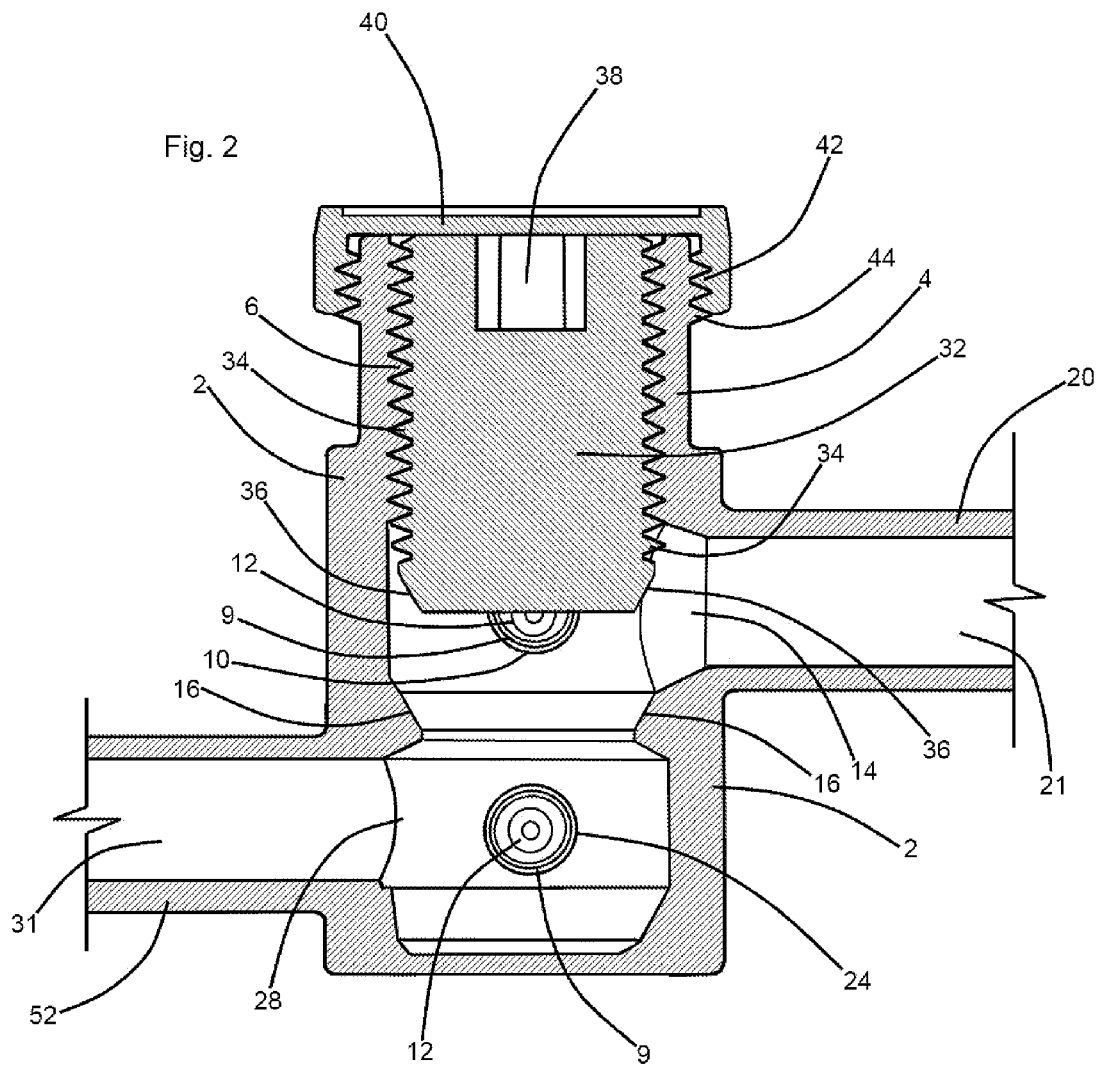
FIG. 2 is a sectional view as indicated in FIG. 1.
Figure 3:
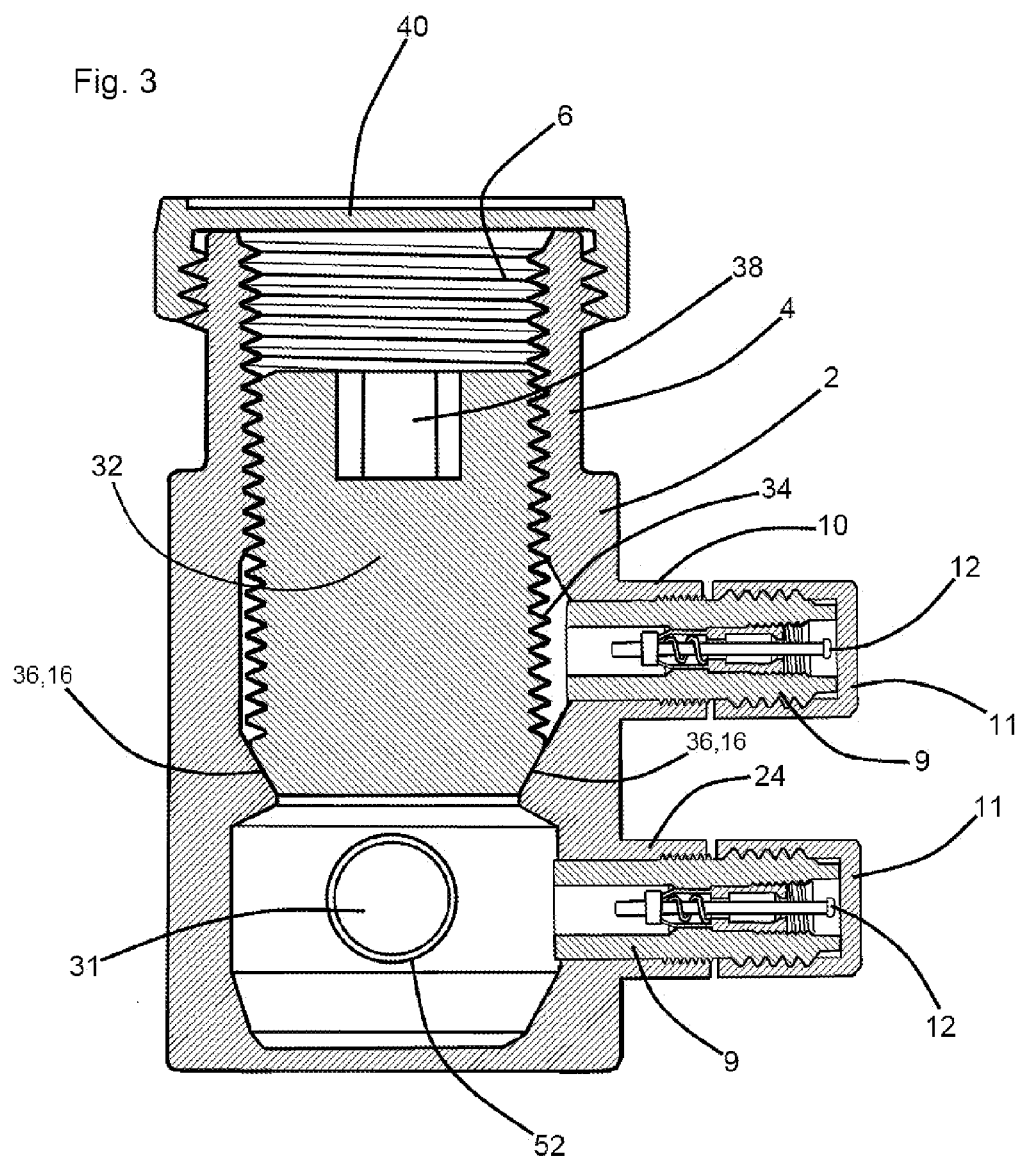
FIG. 3 is an alternative sectional view as indicated in FIG. 1.

Referring simultaneously to FIGS. 1, 2, and 3, the isolation valve 1A, and each of the other isolation valves 1B, 1C, and 1D, has at least a first, and preferably first and second pressure test ports, such ports being represented in the installation configuration of FIG. 1 by upstream port 24 and downstream port 10. In an opposite flow installation orientation (for example the installation orientation of isolation valve 1B depicted in FIG. 4) the under/over orientation of the valve's upstream and downstream pressure testing ports is reversed without any valve function consequences. In such reversed installation orientation, the upstream pressure test port or first port is alternatively positioned above the downstream or second pressure testing port.

Each of the isolation valves 1B, 1C, and 1D preferably has a seat element or surface which is positioned between the valve's upstream and downstream ends. As is depicted in the sectional views of isolation valve 1A, the seat component preferably comprises a conically configured annular wall 16, such wall making up a part of the surface of the inner chamber of valve body 2.

Isolation valve 1A, in common with the substantially identically configured isolation valves 1B, 1C, and 1D, preferably further comprises a sealing element which may alternatively permit and resist refrigerant flows through the operation of valve seating and unseating means. In the preferred embodiment, the sealing element comprises a conical plug element 36 whose annular outer periphery is closely fitted for nesting receipt within and sealing abutting contact with the annular inner surface of seat 16. The depicted preferred seating and unseating means comprise a jack screw actuator including a shaft 32 which is fixedly attached to or formed wholly with the sealing element 36, such shaft 32 having external helical threads 34 which engage internal helical threads 6 formed about the hollow bore of an upwardly extending neck portion 4 of the valve's body 2. In operation of the valve 1A, a provided valve access protecting cap 40 having internal helical threads 42 mounted in threaded engagement with external threads 44 may be initially unscrewed and removed. Thereafter, an air conditioning technician utilizing an Allen wrench may engage such wrench with hexagonal socket 38, and may turn the wrench and shaft 32 clockwise. Such turning motion causes the valve's shaft and seal components to travel downwardly within the hollow chamber of the valve and to seal against seat 16 as depicted in FIG. 3. The seating and unseating means depicted in Drawing FIGS. 2 and 3 are intended as being representative of other commonly known shut off valve structures such as gate valves, ball valves, and pivoting flap valves which may be suitably substituted and which are considered to fall within the scope of the invention.

Referring simultaneously to FIGS. 2 and 3, it can be seen that, upon movement of the sealing element 36 to the closed position depicted in FIG. 3, fluid within the upstream end of the valve's interior chamber remains in communication with the first pressure testing port 24, and fluid within such valve's downstream end remains in communication with second pressure testing port 10. Accordingly, differential pressures within lines and components communicating with ports 24 and 10 may be independently tested. In order to assist with such pressure testing, each of the pressure testing ports of each of the isolation valves 1A, 1B, 1C, and 1D of the inventive air conditioning system is equipped with a concentrically embedded Schrader valve 9 having a valve stem and sealing element 12 which is normally spring biased to a closed position. Upon removal of either of the Schrader valve caps 11, a technician may either apply a pressure gauge to the exposed Schrader valve or may utilize the exposed Schrader valve for refrigerant injection or venting, as needed.

In operation of the instant inventive air conditioning system, referring simultaneously to all figures, the air conditioning technician may close isolation valves 1A and 1B for isolating refrigerant containing conduits within condenser unit 50. Upon such isolation, the technician may utilize either the downstream pressure testing port of isolation valve 1A, or may utilize the upstream pressure testing port of isolation valve 1B for charging the condenser unit 50 with refrigerant and for testing such unit's capability for maintaining the charged pressure. In the event that a leak exists within the condenser unit 50, a pressure gauge applied at either of such pressure testing ports may easily detect the leak and establish that the location of the leak is within the condenser unit 50, or may establish that the system leak resides elsewhere in the system. Similar refrigerant charging and testing applied to either of isolation valves 1C and 1D effectively isolates any leak located within the evaporator unit 56, or establishes that a known leak does not reside at that location. Similar practice applied to isolation valves 1A and 1D advantageously establishes a location of a leak within refrigerant carrying line 52, and manipulation of isolation valves 1B and 1C effectively tests refrigerant carrying line 54.

Referring simultaneously to FIGS. 4 and 5, it may be seen that each of valves 1A, 1B, 1C, and 1D is installed with respect to the condenser and evaporator units 50 and 56 orientations which are identical from the perspective of outer valve structures. Such consistency in installation orientations of the isolation valves is advantageously enabled by the isolation valves' provisions of dual or first and second pressure testing ports situated at opposite sides of each valve's seat. The valves' provisions of the dual pressure test ports advantageously allow an installer of the inventive air conditioning system to orient and re-orient the isolation valves 1A, 1B, 1C, and 1D with respect to the condenser unit 50, the evaporator unit 56, and with respect to the lines 52 and 54, without any possibility of an improper valve reversal which creates a refrigerant circuit zone which is lacking a port capable of refrigerant charging and pressure testing. System installers intuitively arrange valves in manners such as is depicted in FIGS. 4 and 5, and the isolation valve's provisions of dual testing ports enable such configurations. If, for example, the depicted orientations of valves 1C and 1D complicates access to the testing ports, the provisions of the dual testing ports frees the installer to reverse those valves.

Suitably, though less desirably, each isolation valve of the instant inventive air conditioning system may include a single pressure test port. Such configuration is relatively undesirable because the isolation valves are thereby required to be consistently installed in a manner positioning all pressure test ports at upstream valve ends or at downstream valve ends. In the single test port configuration, any deviation from such consistent orientation with respect to refrigerant flow may undesirably produce an untestable circuit zone segment. Such alternative single testing port isolation valve configuration further undesirably prevents an air conditioning technician from testing both the system's refrigerant carrying lines from a single location at either the exterior condenser unit or the interior evaporator unit.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

The invention claimed is:

1. An air conditioning system for refrigerant based cooling of air within a building, the building having an exterior wall, the air conditioning system comprising:
   (a) a condenser unit mounted outwardly from the exterior wall, the condenser unit having a liquid refrigerant output port and an evaporated refrigerant input port;
   (b) an evaporator unit mounted inwardly from the exterior wall, the evaporator unit having a liquid refrigerant input port and an evaporated refrigerant output port;
   (c) a pair of refrigerant carrying lines, each line among the pair of refrigerant carrying lines having a condenser unit end and an evaporator unit end, one of said lines extending from the condenser unit's liquid refrigerant output port to the evaporator unit's liquid refrigerant input port, and the other of said lines extending from the evaporator unit's evaporated refrigerant output port to the condenser unit's evaporated refrigerant input port; and
   (d) exterior and interior pairs of isolation valves, said valve pairs being respectively operatively connected to the refrigerant carrying lines' condenser and evaporator unit ends, each valve among the exterior and interior pairs of isolation valves having upstream and downstream ends and having first and second pressure testing ports respectively opening said each valve's upstream and downstream ends; wherein each valve among the exterior and interior pairs of isolation valves comprises a downwardly positioned seat; wherein each valve among the exterior and interior pairs of isolation valves further comprises a valve sealing element positioned upwardly with respect to said each valve's downwardly positioned seat, and further comprising a jack screw actuator positioned upwardly from the downwardly positioned seat and positioned upwardly from the valve sealing element, said each valve's jack screw actuator being connected operatively to said each valve's sealing element for downwardly seating and upwardly unseating and for alternatively permitting and resisting flows of the refrigerant between said each valve's upstream and downstream ends.

2. The air conditioning system of claim 1 wherein each isolation valve's jack screw actuator comprises a shaft having a lower end, said each valve's seating element comprising a downwardly facing conical wall.

3. The air conditioning system of claim 2 wherein each isolation valve's first and second pressure testing ports are respectively positioned between said each valve's seat and upstream end, and between said each valve's seat and downstream end.

4. The air conditioning system of claim 3 further comprising a plurality of Schrader valves, and wherein flows of the refrigerant through the first and second pressure testing ports are controlled by the Schrader valves.

5. The air conditioning system of claim 4 further comprising a plurality of valve stem caps, each cap among the plurality of valve stem caps covering one of the Schrader valves.

6. The air conditioning system of claim 5 further comprising a plurality of access caps, each cap among the plurality of access caps covering one of the jack screw actuators.

\* \* \* \* \*